US012278473B2

(12) United States Patent
Chang

(10) Patent No.: US 12,278,473 B2
(45) Date of Patent: Apr. 15, 2025

(54) POWER CIRCUIT AND ELECTRONIC DEVICE HAVING THE SAME

(71) Applicant: ASUSTEK COMPUTER INC., Taipei (TW)

(72) Inventor: Hua-Hsuan Chang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 267 days.

(21) Appl. No.: 18/158,673

(22) Filed: Jan. 24, 2023

(65) Prior Publication Data
US 2024/0047959 A1 Feb. 8, 2024

(30) Foreign Application Priority Data
Aug. 3, 2022 (TW) .................................. 111129107

(51) Int. Cl.
*H02H 3/08* (2006.01)
*H02H 7/20* (2006.01)
*H02M 1/32* (2007.01)

(52) U.S. Cl.
CPC ................ *H02H 3/08* (2013.01); *H02H 7/20* (2013.01); *H02M 1/32* (2013.01)

(58) Field of Classification Search
CPC ............ H02H 3/08; H02H 7/20; H02H 3/087; H02M 1/32; H02M 1/0009; H02M 1/008
USPC ........................................................ 361/93.1
See application file for complete search history.

(56) References Cited

U.S. PATENT DOCUMENTS

| | | | | |
|---|---|---|---|---|
| 6,901,520 | B2 * | 5/2005 | Odaohhara | G06F 1/28 361/88 |
| 11,768,253 | B1 * | 9/2023 | Maley | G01R 31/52 324/538 |
| 2005/0007711 | A1 | 1/2005 | Liu et al. | |
| 2009/0051315 | A1 * | 2/2009 | Wang | H02J 7/0031 320/113 |
| 2011/0078470 | A1 * | 3/2011 | Wang | H01M 10/482 429/150 |
| 2014/0035515 | A1 * | 2/2014 | Wang | H01M 10/44 320/162 |

(Continued)

FOREIGN PATENT DOCUMENTS

| | | | | |
|---|---|---|---|---|
| CN | 202474804 U | | 10/2012 | |
| CN | 103296716 A | * | 9/2013 | ............. G06F 1/263 |

(Continued)

*Primary Examiner* — Dharti H Patel
(74) *Attorney, Agent, or Firm* — Muncy, Geissler, Olds & Lowe, P.C.

(57) ABSTRACT

A power circuit, adapted to supply power to a computer system, includes a power connector, a charge unit, a short current protection circuit, and a first switch circuit. The power connector is configured to connect to the adapter to receive an input voltage. The charge unit includes an input end configured to receive the input voltage and an output end. The charge unit converts the input voltage into a system voltage. The short current protection circuit includes a detection circuit and a first logic control circuit. The detection circuit detects an impedance of at least one of the input end and the output end to generate a detection signal. The first logic control circuit generates a power control signal according to the detection signal. The first switch circuit is connected between the power connector and the input end and is controlled by the power control signal.

13 Claims, 4 Drawing Sheets

(56) References Cited

U.S. PATENT DOCUMENTS

| | | | | |
|---|---|---|---|---|
| 2014/0246904 A1* | 9/2014 | Wu | ................ | H02J 7/0068 |
| | | | | 307/23 |
| 2015/0015186 A1* | 1/2015 | Xiang | ............ | H02J 7/007192 |
| | | | | 320/107 |
| 2015/0194824 A1* | 7/2015 | Tu | ................ | H02J 7/342 |
| | | | | 320/103 |

FOREIGN PATENT DOCUMENTS

| | | |
|---|---|---|
| CN | 104467782 A | 3/2015 |
| CN | 208386119 U | 1/2019 |
| CN | 110221673 A | 9/2019 |
| CN | 113258650 A | 8/2021 |
| CN | 215120097 U | 12/2021 |
| CN | 114124079 A | 3/2022 |

* cited by examiner

POWER CIRCUIT AND ELECTRONIC DEVICE HAVING THE SAME

CROSS-REFERENCE TO RELATED APPLICATION

This application claims the priority benefit of Taiwan application serial No. 111129107, filed on Aug. 3, 2022. The entirety of the above-mentioned patent application is hereby incorporated by reference herein and made a part of the specification.

BACKGROUND OF THE INVENTION

Field of the Invention

The disclosure relates to a power circuit, and in particular, to a power circuit with a short circuit protection function and an electronic device having the same.

Description of the Related Art

Currently, short current protection (SCP) mechanisms used in computer systems all rely on a built-in short circuit protection function of a chip itself. To be specific, when it is detected that an output voltage of an output end of the chip decreases to a certain level, an under voltage protection (UVP) mechanism is triggered to provide the short circuit protection function.

However, conventional short current protection methods do not provide a short circuit protection function for a power supply terminal (VCC) of the computer system. Because the voltage of the power supply terminal of the computer system is usually supplied to multiple groups of power rails, a large current generated by a short circuit at the power supply terminal is much greater than a current generated by a short circuit at the output end of the chip, which is likely to damage other components in the computer system, resulting in increased maintenance costs.

BRIEF SUMMARY OF THE INVENTION

The disclosure provides a power circuit, configured to connect to an adapter and adapted for supplying power to a computer system. The power circuit includes a power connector, a charge unit, a short current protection circuit, and a first switch circuit. The power connector is configured to connect to an adapter to receive an input voltage.

The charge unit is electrically coupled to the power connector, and includes an input end and an output end. The input end is configured to receive the input voltage. The charge unit is configured to convert the input voltage into a system voltage and supply the system voltage to the computer system through the output end.

The short current protection circuit is electrically coupled to the charge unit, and includes a detection circuit and a first logic control circuit. The detection circuit is configured to detect an impedance of at least one of the input end and the output end to generate a detection signal.

The first logic control circuit is configured to generate a power control signal according to the detection signal. The first switch circuit is connected between the power connector and the input end and is controlled by the power control signal.

The disclosure further provides an electronic device. The electronic device includes a computer system and a power circuit. The power circuit is configured to supply power to the computer system, and includes a power connector, a charge unit, a short current protection circuit, and a first switch circuit. The power connector is configured to connect to an adapter to receive an input voltage.

The charge unit is electrically coupled to the power connector, and includes an input end and an output end. The input end is configured to receive the input voltage. The charge unit is configured to convert the input voltage into a system voltage and supply the system voltage to the computer system through the output end.

The short current protection circuit is electrically coupled to the power connector, and includes a detection circuit and a first logic control circuit. The detection circuit is configured to detect an impedance of at least one of the input end and the output end to generate a detection signal.

The first logic control circuit is configured to generate a power control signal according to the detection signal. The first switch circuit is connected between the power connector and the input end and is controlled by the power control signal.

The power circuit provided in the disclosure provides an overall short current protection for a power supply end of the computer system, to avoid a large current caused by a short circuit of the input end or the output end of the charge unit to damage other components in the computer system and result in increased maintenance costs.

DETAILED DESCRIPTION OF THE EMBODIMENTS

A more detailed descriptions of specific embodiments of the disclosure is provided below with reference to the schematic diagrams. The features and advantages of the disclosure will be more evident from the following description and claims. It should be noted that all of the drawings are very simplified and are not drawn to scale, but are used for convenience and clarity of explaining the objectives of the embodiments of the disclosure.

Figure 1:
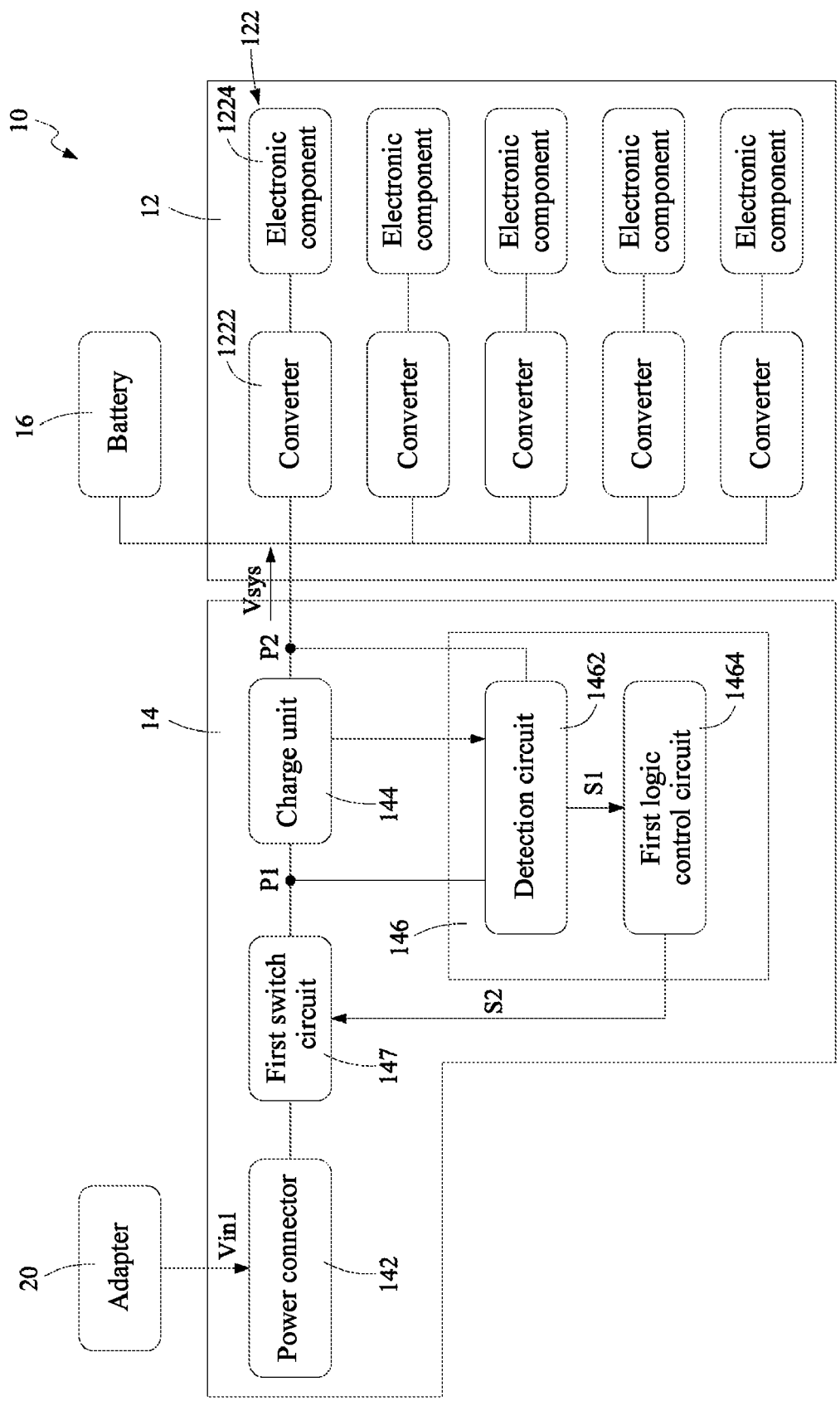
FIG. 1 is a schematic block diagram of an electronic device according to an embodiment of the disclosure.

FIG. 1 is a schematic block diagram of an electronic device 10 according to an embodiment of the disclosure. As shown in the figure, the electronic device 10 includes a computer system 12 and a power circuit 14. The computer system 12 includes a plurality of power rails 122 (only one of the power rails is marked in the figure). The power rails 122 each include a converter 1222 to output different voltages, which are 3.3 V, 5 V, 12 V, etc. in some embodiments, to meet requirements for the operation of different electronic components 1224 (including a CPU, a graphics processing unit, a fan, etc.). In an embodiment, the electronic device 10 further includes a battery 16. The power circuit 14 is configured to selectively supple power to the computer system 12 or charge the battery 16.

The power circuit 14 includes a power connector 142, a charge unit 144, a short current protection circuit 146, and a first switch circuit 147.

The power connector 142 is configured to connect to an adapter 20 to receive an input voltage Vin1. In an embodiment, the power connector 142 is a direct current (DC) jack. In some other embodiments, the power connector 142 is a universal serial port connector configured to connect to a universal serial port adapter. In some embodiments, the universal serial port connector is a universal serial port Type C connector.

The charge unit 144 includes an input end P1 and an output end P2. The input end P1 is configured to receive the input voltage Vin1. The charge unit 144 is configured to convert the input voltage Vin1 into a system voltage Vsys and supply the system voltage Vsys to the output end P2. The output end P2 is configured to supply power to the plurality of power rails 122 of the computer system 12.

The short current protection circuit 146 includes a detection circuit 1462 and a first logic control circuit 1464. The detection circuit 1462 is configured to detect an impedance of the input end P1 and the output end P2, to generate a detection signal S1. The detection signal S1 is configured for indicating whether the input end P1 or the output end P2 is short circuited. In some other embodiments, the detection circuit 1462 is configured for detecting only the impedance of the input end P1 or only the impedance of the output end P2 to simplify the circuit design.

The first logic control circuit 1464 is configured to generate a power control signal S2 according to the detection signal S1. The first switch circuit 147 is connected between the power connector 142 and the input end P1 and is controlled by the power control signal S2.

In an embodiment, the first switch circuit 147 includes a metal-oxide-semiconductor field effect transistor (MOSFET) element. The MOSFET element is controlled by the power control signal S2. In some other embodiments, the first switch circuit 147 includes two back-to-back MOSFET elements. The two MOSFET elements are controlled by the power control signal S2, to provide a bidirectional current blocking effect.

When the detection signal S1 indicates that at least one of the input end P1 or the output end P2 is short circuited, the first logic control circuit 1464 generates the power control signal S2 to maintain the first switch circuit 147 in an off state. On the contrary, when the detection signal S1 indicates that neither the input end P1 nor the output end P2 is short circuited, the first logic control circuit 1464 generates the power control signal S2 to switch the first switch circuit 147 to an on state.

Figure 2:
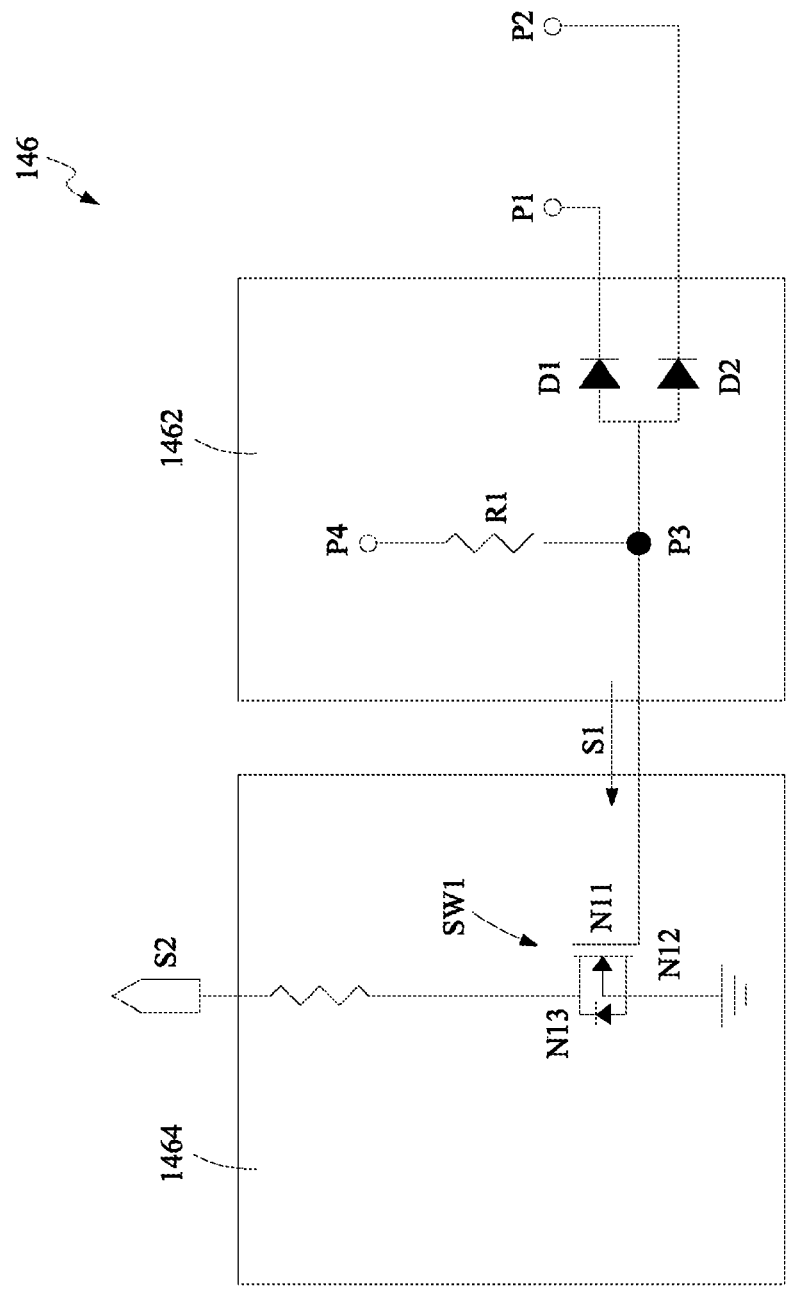
FIG. 2 is a circuit diagram of an embodiment of a detection circuit and a first logic control circuit of a short current protection circuit in FIG. 1.

Referring to FIG. 2, FIG. 2 is a circuit diagram of an embodiment of the detection circuit 1462 and the first logic control circuit 1464 of the short current protection circuit 146 in FIG. 1.

As shown in the figure, the detection circuit 1462 includes a detection signal output end P3, a first resistor R1, a first diode D1, and a second diode D2. The first resistor R1 is connected between the detection signal output end P3 and a first power supply voltage end P4. The first power supply voltage end P4 is configured to provide a fixed voltage, which is 3 V in some embodiments. The first diode D1 is forwardly connected between the input end P1 and the detection signal output end P3, the second diode D2 is forwardly connected between the output end P2 and the detection signal output end P3. The detection signal output end P3 is configured to generate the detection signal S1.

The first logic control circuit 1464 includes a first switch element SW1. The first switch element SW1 includes a first control end N11, a first low-voltage end N12, and a first high-voltage end N13. The first control end N11 is controlled by the detection signal S1. The first high-voltage end N13 is configured to generate the power control signal S2.

In an embodiment, the first switch element SW1 is a metal-oxide-semiconductor field effect transistor (MOSFET) element.

The following describes three possible operational states of the power circuit 14.

State 1: An Adapter is Inserted, and No Short Circuit Occurs

The detection circuit 1462 detects that neither the input end P1 (AC_SOURCE_IN) nor the output end P2 (AC_BAT_SYS) is short circuited, and generates a high potential detection signal S1 to switch the first switch element SW1 (PQ9504B) to an on state.

After the first switch element SW1 is switched on, the first high-voltage end N13 generates a low potential power control signal S2, to switch the first switch circuit 147 to an on state. In this case, the input voltage Vin1 is supplied to the input end P1 of the charge unit 144, and converted by the charge unit 144 to generate the system voltage Vsys, which is supplied to the computer system 12, to supply power to the plurality of power rails 122.

State 2: A Short Circuit Occurs After the Adapter is Inserted.

It is assumed that the input end P1 is short circuited. The short circuit generates a large current and decreases a voltage level of the input end P1 to 0 V. In this case, the detection circuit 1462 generates a low potential detection signal S1. A voltage level of the detection signal S1 roughly corresponds to a forward bias of the first diode D1.

Similar to the case where the input end P1 is short circuited, when the output end P2 is short circuited, a voltage level of the output end P2 also decreases to 0 V, and the detection circuit generates a low potential detection signal S1.

The low potential detection signal S1 is insufficient to maintain the first switch element SW1 in the on state. Therefore, the first switch element SW1 is switched to the off state. In this case, the first high-voltage end N13 generates a high potential power control signal S2, to switch the first switch circuit 147 to an off state. This avoids a continuous large current which damages the internal components of the computer system 12.

State 3: A Short Circuit Occurs Before an Adapter is Avoided.

The short current protection circuit 146 in the disclosure starts before the charge unit 144 operates. Therefore, the detection circuit 1462 switches the first switch circuit 147 to the off state when detecting that the input end P1 or the output end P2 is short circuited, so as to avoid a continuous large current which damages the internal components of the computer system 12.

Figure 3:
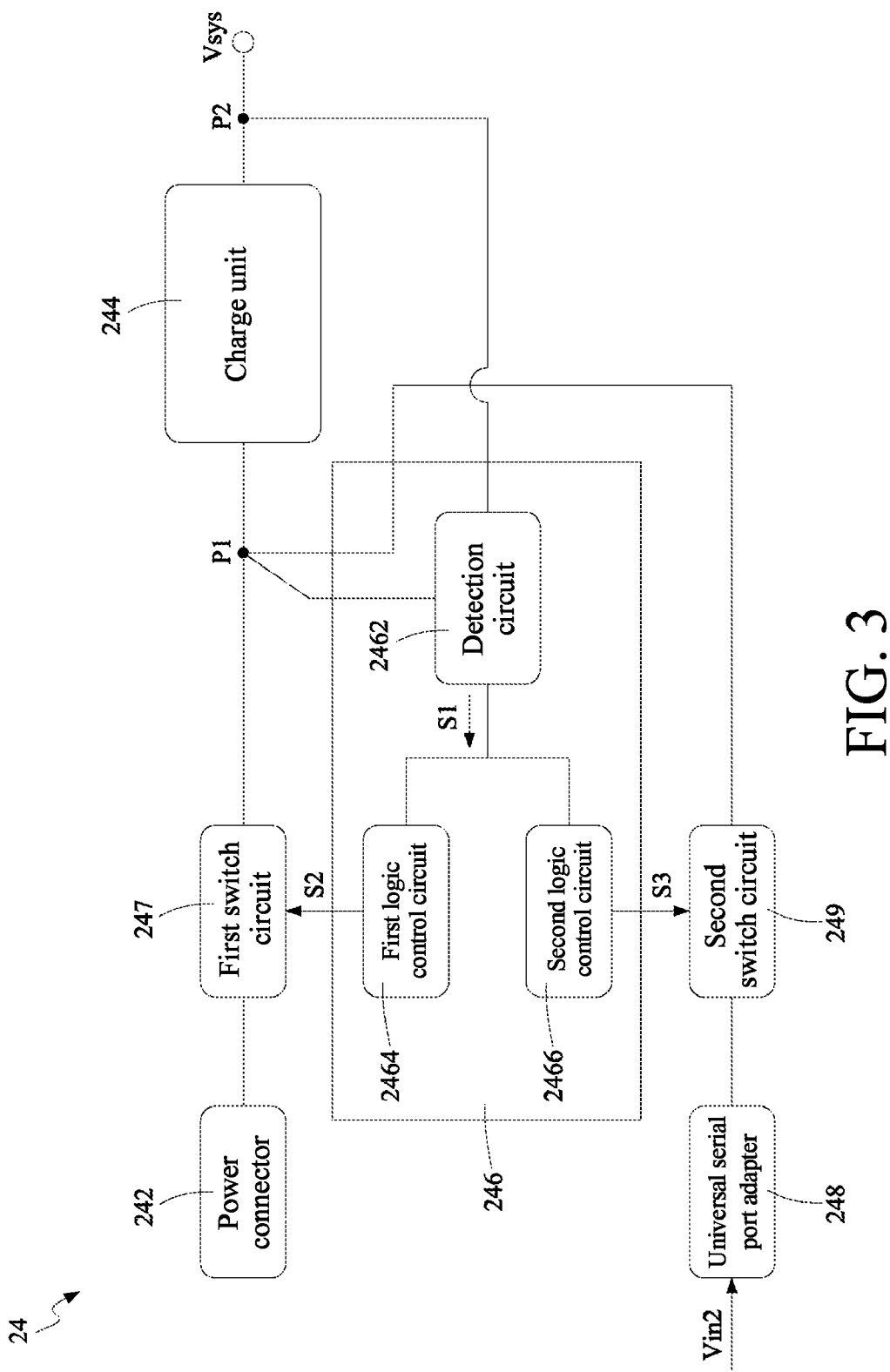
FIG. 3 is a schematic block diagram of another embodiment of a power circuit according to the disclosure; and, FIG. 4 is a circuit diagram of an embodiment of a second logic control circuit of a short current protection circuit in FIG. 3.

Referring to FIG. 3, FIG. 3 is a schematic block diagram of another embodiment of the power circuit 24 according to the disclosure.

The power circuit 24 in this embodiment includes a power connector 242, a charge unit 244, a short current protection circuit 246, a first switch circuit 247, a universal serial port connector 248, and a second switch circuit 249. The short current protection circuit 246 includes a detection circuit 2462, a first logic control circuit 2464, and a second logic control circuit 2466.

The power connector 242, the charge unit 244, the first switch circuit 247, and the detection circuit 2462 and the first logic control circuit 2464 in the short current protection circuit 246 are similar to the corresponding elements in FIG. 1 and FIG. 2. For operation of the detection circuit 2462, the first logic control circuit 2464, and the first switch circuit 247, refer to FIG. 2 and related descriptions, which will not be repeated herein. The following describes the operation of the second logic control circuit 2466 and the second switch circuit 249.

The second logic control circuit 2466 generates a power transmission control signal S3 according to the detection signal S1. The second switch circuit 249 is connected between the universal serial port connector 248 and the input end P1 and is controlled by the power transmission control signal S3.

In an embodiment, the second switch circuit 249 includes two back-to-back MOSFET elements, to provide a bidirectional current blocking effect. The two MOSFET elements are controlled by the power transmission control signal S3.

When the detection signal S1 indicates that at least one of the input end P1 or an output end P2 is short circuited, the second logic control circuit 2466 generates the power transmission control signal S3 to maintain the second switch circuit 249 in the off state. On the contrary, when the detection signal S1 indicates that neither the input end P1 nor the output end P2 is short circuited, the second logic control circuit 2466 generates the power transmission control signal S3 to switch the second switch circuit 249 to the on state.

Figure 4:
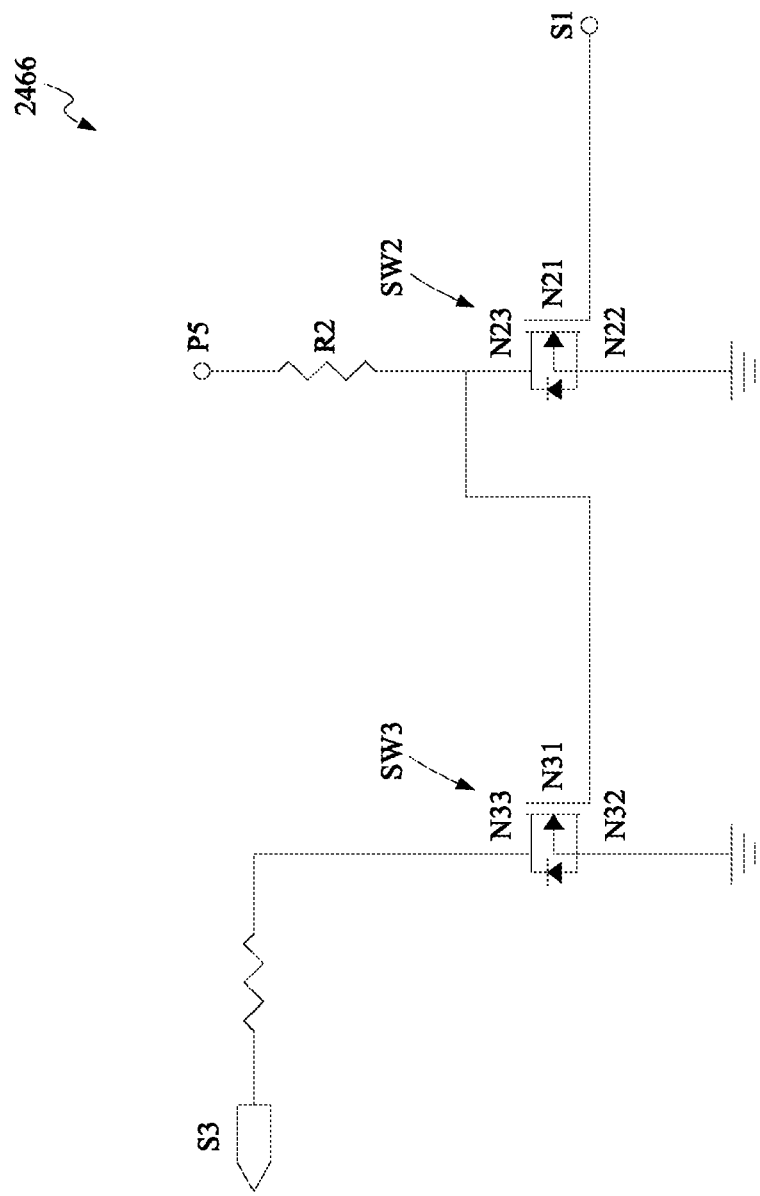

Referring to FIG. 4, FIG. 4 is a circuit diagram of an embodiment of the second logic control circuit 2466 of the short current protection circuit 246 in FIG. 3.

The second logic control circuit 2466 is electrically connected to the detection circuit 2462 to receive the detection signal S1. The second logic control circuit 2466 includes a second resistor R2, a second switch element SW2, and a third switch element SW3.

The second switch element SW2 includes a second control end N21, a second low-voltage end N22, and a second high-voltage end N23. The second control end N21 is controlled by the detection signal S1. The second resistor R2 is connected between the second high-voltage end N23 and a second power supply voltage end P5.

The second power supply voltage end P5 is configured to provide a fixed voltage, which is 3 V in some embodiments. The third switch element SW3 includes a third control end N31, a third low-voltage end N32, and a third high-voltage end N33. The third control end N31 is controlled by the second high-voltage end N23. The third high-voltage end N33 is configured to generate the power transmission control signal S3.

The following describes three possible operational states of the power circuit 24.

State 1: A Universal Serial Port Adapter is Inserted, and No Short Circuit Occurs The detection circuit 2462 detects that neither the input end P1 (AC_SOURCE_IN) nor the output end P2 (AC_BAT_SYS) is short circuited, and generates a high potential detection signal S1 to switch the second switch element SW2 (PQ9506B) to the on state.

After the second switch element SW2 is switched on, the second high-voltage end N23 changes into a low potential state, and the third switch element SW3 (PQ9506A) is switched to the off state, thereby maintaining the third high-voltage end N33 in a high potential state (that is, a high potential power transmission control signal S3 is generated).

The high potential power transmission control signal S3 maintains the second switch circuit 249 in the on state. In this case, a universal serial port input voltage Vin2 from the universal serial port connector 248 is supplied to the input end P1 of the charge unit 144, and converted by the charge unit 144 to generate the system voltage Vsys, which is supplied to the computer system 12, to supply power to the plurality of power rails 122.

State 2: A Short Circuit Occurs After a Universal Serial Port Adapter is Inserted It is assumed that the input end P1 is short circuited. The short circuit generates a large current and decreases a voltage level of the input end P1 to 0 V. The detection circuit 2462 generates a low potential detection signal S1. A voltage level of the detection signal S1 roughly corresponds to a forward bias of the first diode D1.

The low potential detection signal S1 is insufficient to maintain the second switch element SW2 in the on state. Therefore, the second switch element SW2 is switched to the off state. In this case, the second high-voltage end N23 changes into a high potential state, and the third switch element SW3 is switched to the on state, thereby pulling down the potential of the third high-voltage end N33 (that is, a low potential power transmission control signal S3 is generated). The low potential power transmission control signal S3 switches the second switch circuit 249 to the off state. This avoids a continuous large current which damages the internal components of the computer system 12.

State 3: A Short Circuit Occurs Before a Universal Serial Port Adapter is Inserted The short current protection circuit 246 in the disclosure starts before the charge unit 244 operates. Therefore, the detection circuit 2462 switches the second switch circuit 249 to the off state when detecting that the input end P1 or the output end P2 is short circuited, so as to avoid a continuous large current which damages the internal components of the computer system 12.

In conclusion, the power circuit 14, 24 provided in the disclosure provides an overall short current protection for a power supply end of the computer system 12, to avoid a large current caused by the short circuit of the input end P1 or the output end P2 of the charge unit 144, 244 to damage other components in the computer system 12 and result in increased maintenance costs.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. A power circuit, configured to connect to an adapter and adapted for supplying power to a computer system, the power circuit comprising:
   a power connector, configured to connect to the adapter to receive an input voltage;
   a charge unit, electrically coupled to the power connector, and comprising an input end and an output end, wherein the input end is configured to receive the input voltage, and the charge unit is configured to convert the input voltage into a system voltage and supply the system voltage to the computer system through the output end;
   a short current protection circuit, electrically coupled to the charge unit, and comprising:

a detection circuit, configured to detect an impedance of at least one of the input end and the output end to generate a detection signal; and a first logic control circuit, configured to generate a power control signal according to the detection signal; and a first switch circuit, connected between the power connector and the input end, and controlled by the power control signal.

2. The power circuit according to claim 1, wherein the first logic control circuit comprises a first switch element, the first switch element comprises a first control end, a first low-voltage end and a first high-voltage end, the first control end is controlled by the detection signal, and the first high-voltage end is configured to generate the power control signal.

3. The power circuit according to claim 2, wherein the detection circuit comprises a detection signal output end, a first resistor, a first diode, and a second diode, the first resistor is connected between the detection signal output end and a first power supply voltage end, the first diode is forwardly connected between the input end and the detection signal output end, the second diode is forwardly connected between the output end and the detection signal output end, and the detection signal output end is configured to generate the detection signal.

4. The power circuit according to claim 2, wherein the first switch element is a metal-oxide-semiconductor field effect transistor (MOSFET) element.

5. The power circuit according to claim 1, wherein the first switch circuit comprises two back-to-back MOSFET elements, and the two MOSFET element are controlled by the power control signal.

6. The power circuit according to claim 1, wherein the power connector is a direct current (DC) jack.

7. The power circuit according to claim 6, further comprising a universal serial port connector, a second logic control circuit, and a second switch circuit, wherein the second switch circuit is connected between the universal serial port connector and the input end, the second logic control circuit is configured to generate a power transmission control signal according the detection signal, and the second switch circuit is controlled by the power transmission control signal.

8. The power circuit according to claim 7, wherein the second logic control circuit comprises a second resistor, a second switch element, and a third switch element, the second switch element comprises a second control end, a second low-voltage end, and a second high-voltage end, the second control end is controlled by the detection signal, the second resistor is connected between the second high-voltage end and a second power supply voltage end, the third switch element comprises a third control end, a third low-voltage end, and a third high-voltage end, the third control end is controlled by the second high-voltage end, the third high-voltage end is configured to generate the power transmission control signal.

9. The power circuit according to claim 8, wherein the second switch circuit comprises two back-to-back MOSFET elements, and the two MOSFET elements are controlled by the power transmission control signal.

10. The power circuit according to claim 1, wherein the power connector is a universal serial port connector.

11. The power circuit according to claim 1, wherein the computer system comprises a plurality of power rails, and the output end is configured to supply power to the power rails.

12. The power circuit according to claim 1, further comprising a battery, wherein the power circuit is configured to selectively supply power to the computer system or charge the battery.

13. An electronic device, comprising:
a computer system; and,
a power circuit, adapted for supplying power to the computer system, the power circuit comprising:
  a power connector, configured to connect to an adapter to receive an input voltage;
  a charge unit, electrically coupled to the power connector, and comprising an input end and an output end, wherein the input end is configured to receive an input voltage, the charge unit is configured to convert the input voltage into a system voltage and supply the system voltage to the computer system through the output end;
  a short current protection circuit, electrically coupled to the power connector, and comprising:
    a detection circuit, configured to detect an impedance of at least one of the input end and the output end to generate a detection signal; and
    a first logic control circuit, configured to generate a power control signal according to the detection signal; and
  a first switch circuit, connected between the power connector and the input end, and controlled by the power control signal.

* * * * *